US008122168B2

(12) United States Patent
Duggirala et al.

(10) Patent No.: US 8,122,168 B2
(45) Date of Patent: Feb. 21, 2012

(54) METHOD FOR IMPLEMENTING CONCURRENT PRODUCER-CONSUMER BUFFERS

(75) Inventors: Surya V Duggirala, Eagan, MN (US); Maged M Michael, Danbury, CT (US); Christoph Von Praun, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 11/750,056

(22) Filed: May 17, 2007

(65) Prior Publication Data

US 2008/0288496 A1 Nov. 20, 2008

(51) Int. Cl.
*G06F 3/00* (2006.01)
*G06F 5/00* (2006.01)

(52) U.S. Cl. ........................................ 710/52; 710/57

(58) Field of Classification Search ........................ None
See application file for complete search history.

(56) References Cited

U.S. PATENT DOCUMENTS

| | | | | |
|---|---|---|---|---|
| 5,844,569 | A * | 12/1998 | Eisler et al. | 345/619 |
| 5,873,089 | A * | 2/1999 | Regache | 707/100 |
| 6,212,568 | B1 * | 4/2001 | Miller et al. | 709/236 |
| 6,898,650 | B1 * | 5/2005 | Gao et al. | 710/200 |
| 6,925,515 | B2 * | 8/2005 | Burns et al. | 710/200 |
| 7,243,354 | B1 * | 7/2007 | Chhabra et al. | 719/314 |
| 7,489,567 | B2 * | 2/2009 | Radulescu | 365/189.12 |
| 2002/0194338 | A1 * | 12/2002 | Elving | 709/226 |
| 2003/0028695 | A1 * | 2/2003 | Burns et al. | 710/200 |
| 2006/0123156 | A1 * | 6/2006 | Moir et al. | 710/33 |

OTHER PUBLICATIONS

James L Peterson, Abraham Silberschatz, "Operating System Concepts," Chapter 9, pp. 307-345, Published on Jan. 1, 1985.*

C.K. Shene, Dept. of Computer Science, Mich. Tech. Univ. "ThreadMentor" http://www.cs.mtu.edu/~shene/NSF-3/e-Book/MONITOR/ProducerConsumer-1/MON-example-buffer-1.html.*

* cited by examiner

*Primary Examiner* — Henry Tsai
*Assistant Examiner* — Kris Rhu
(74) *Attorney, Agent, or Firm* — Scully, Scott, Murphy & Presser, P.C.; Daniel P. Morris, Esq.

(57) ABSTRACT

A method and a system for implementing concurrent producer-consumer buffers are provided. The method and system in one aspect uses separate locks, one for putter and another for taker threads operating on a concurrent producer-consumer buffer. The locks operate independently of a notify-wait process.

15 Claims, 6 Drawing Sheets

```
class BoundedBuffer {
  private Object[ ] buffer; // the circular array

  private int takeIndex = 0; // beginning of the buffer

  private int putIndex = 0; // the end of the buffer

  private AtomicInteger numberOfUsedSlots = new AtomicInteger (0);

  ...
}

class AtomicInteger {
  public int get ( ) {...}
  public int getAndDecrement ( ) {...}
  public int getAndIncrement ( ) {...}
  ...
}
```

```
public Object put (Object x, long timeoutInMillis)  {
    long start = (timeoutInMillis <= 0) ? 0 : -1 ;
    long waitTime = timeoutInMillis ;
    Object ret = null ;
    while (true)  {
        synchronized (lock)  {
            if (numberOfUsedSlots.get ( ) < buffer.length) {
                insert (x) ;
                numberOfUsedSlots.getAndIncrement ( ) ;
                ret = x;
            }
        }
        if (ret  != null)  {
            notifyGet_( ) ;
            return ret;
        }
        if (start == -1) start = System.currentTimeMillis ( ) ;
        int spinctr = SPINS_ ;
        while (numberOfUsedSlots.get ( )  >= buffer.length)  {
            if (waitTime <= 0)
                return null ;
            if (spinctr > 0)
                spinctr - - ; // spin
            else
                waitPut_(timeoutInMillis) ; // block
            waitTime = timeoutInMillis - (System.currentTimeMillis ( ) - start) ;
        }
    }
}
```

```
Object take (long timeout) {
    Object old = null ;
     long start = (timeout <= 0)  ? 0 : -1;
     long waitTime = timeout;
     while (true)  {
         synchronized (this)  {
502        if (numberOfUsedSlots.get ( ) > 0)  {
              old = extract ( ) ;
              numberOfUsedSlots.getAndDecrement ( ) ;
           }
         }

504      if (old != null)  {
          notifyPut_( ) ;
          return old;
         }
         if (start == -1) start = System.currentTimeMillis ( );
         int spinctr = SPINS_ ;
         while (numberOfUsedSlots.get ( ) <= 0)  {
            if (waitTime <= 0)  {
               return null ;
            }                 if (spinctr > 0)  {
              Spinctr - - ; // spin
            } else  {
                waitGet_(waitTime) ; // block
            }
            waitTime = timeout - (System.currentTimeMillis ( ) - start) ;
           }
         }
    }
```

FIG. 5

```
private Object putQueue_ = new Object ( ) ;
private int putQueueLen_ = 0 ;
private Object getQueue_ = new Object ( ) ;
private int getQueueLen_ = 0 ;


private void notifyPut_ ( ) {
   if (putQueueLen_ > 0 ) {
     synchronized (putQueue_) {
       putQueue_.notify ( ) ;
     }
   }
}


private void waitPut_ (long timeout) throws InterruptedException {
   synchronized (putQueue_) {
        try {
          putQueueLen_ ++;
          putQueue_.wait (timeout) ;
        } catch (InterruptedException ex) {
          putQueue_.notify ( ) ;
          throw ex ;
        } finally {
          putQueueLen_ - - ;
        }
      }
  }
```

Conditional notify / benign race:

- notification might be unduly omitted

- recovery because peers wake up regularly (no infinite wait)

FIG. 6

METHOD FOR IMPLEMENTING CONCURRENT PRODUCER-CONSUMER BUFFERS

FIELD OF THE INVENTION

The present application relates generally to computer systems and, particularly to a method and system for implementing concurrent producer-consumer buffers.

BACKGROUND OF THE INVENTION

In multithreaded programs, several threads can be involved in the processing of a single request and a bounded buffer instance can serve to decouple the operation of threads with different roles in the request handling. For example, few (for example, one to three) threads poll requests from a network socket and insert them at one end into a bounded buffer. These threads are referred to as "putters." At the other end of the buffer, a plurality of worker threads take requests from the buffer and service them. These threads are referred to as "takers."

For example, a bounded buffer may be implemented as a circular array with two indices, takeIndex and putIndex, and two counters, numberOfUsedSlots and numberOfEmptySlots. The two counters indicate to takers and putters whether or not the buffer is empty or full, respectively. The buffer is protected by two locks. One lock primarily protects numberOfUsedSlots as well as take-related variables of the buffer, i.e. the takeIndex variable and the next used slot in the buffer. The other lock protects numberOfEmptySlots as well as put-related variables of the buffer, i.e. the putIndex variable and the next empty slot in the buffer.

In operation, both putters and takers need to acquire the two locks in reverse order but in sequence (hence no deadlock due to circular wait). For example, a put operation first acquires the put-related lock and if the buffer is not fall, it inserts an object, decrements numberOfEmptySlots, releases the put-related lock and then acquires the take-related lock and increments numberOfUsedSlots, notifies any takers that are waiting for the buffer to be not empty and then releases the take-related lock. If the putter finds the buffer full, it waits on the put-related lock for notification when the buffer becomes not full. Similar steps of acquiring the locks are performed by takers when extracting a request from the buffer.

A significant source of contention and high latency in this implementation is that both putters and takers acquire both locks even when the buffer is neither empty nor full. Moreover, the critical locks may be inflated and deflated in case putter or taker threads have to wait. Accordingly, an improved mechanism for inserting and extracting from a buffer is desirable.

BRIEF SUMMARY OF THE INVENTION

A method and system for implementing concurrent producer-consumer buffers is provided. A method for implementing concurrent producer-consumer buffers in one aspect may comprise providing a putter lock for performing putter operations associated with a concurrent producer-consumer buffer and providing a taker lock for performing taker operations associated with the concurrent producer-consumer buffer. The method may also include allowing said putter operations to acquire and lock the putter lock when putting into the concurrent producer-consumer buffer, and allowing said taker operations to acquire and lock the taker lock when taking from the concurrent producer-consumer buffer, said putter operations and taker operations being performed independently of one another, said taker and said putter lock begin acquired and released independently of one another and of a wait-notify mechanism.

In another aspect, a method for implementing concurrent producer-consumer buffers may comprise acquiring a first lock for inserting an element in a concurrent producer-consumer buffer, acquiring a second lock for extracting an element from the concurrent producer-consumer buffer, wherein said inserting and extracting can be performed simultaneously without interfering with one another, and wherein said first lock and said second lock are acquired and released independently of an associated wait-notify mechanism providing notification and suspend procedures when the concurrent producer-consumer buffer becomes empty or full.

A system for implementing concurrent producer-consumer buffers in one aspect may comprise a first lock associated with an insertion operation performed on a concurrent producer-consumer buffer, and a second lock associated with an extraction operation performed on the concurrent producer-consumer buffer. The system in this aspect may farther comprise a controller operable to acquire the first lock for inserting a first element in the concurrent producer-consumer buffer, the controller farther operable to acquire a second lock for extracting a second element from the concurrent producer-consumer buffer, said controller further operable to insert into and extract from the concurrent producer-consumer buffer simultaneously, and wherein the controller is operable to acquire and release said first lock and said second lock independently of an associated wait-notify mechanism providing notification and suspend procedures when the concurrent producer-consumer buffer becomes empty or full.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 3 illustrates an example data structure or data declaration of the buffer operations in one embodiment of the present disclosure.

FIG. 4 illustrates a put operation in one embodiment of the present disclosure.

FIG. 5 illustrates a take operation in one embodiment of the present disclosure.

FIG. 6 illustrates separate structures for queuing with wait and notify methods.

DETAILED DESCRIPTION

A method and system for providing novel design for buffer structure that, for example, reduces latency and contention on the buffer's lock structures are provided. In one embodiment, the method and system of the present disclosure enables producers to operate using one lock on one side of a buffer, while consumers operate on the other side of the buffer using a separate lock. Buffer size may be implemented as a lock-free AtomicInteger, supported in Java JDK 5.0 or simulated using a dedicated lock which is separate from the aforementioned locks guarding the operations on either side of the buffer. When the buffer is neither full nor empty, producers and consumers uses one lock acquisition and release, and neither producers nor consumers are blocked by each other. In one embodiment, the two main locks are always flat (also referred to as deflated). That is, the two main locks are not used for wait-notify, for instance. Such mechanism reduces the latency of their acquisition and release in the fast path. When the buffer is either empty or fill, separate condition variables on either side of the buffer facilitate efficient waiting for notifications of changes in empty or full buffer conditions. In some implementation, condition variables are associated with locks that may need to be inflated to provide wait/notify functionality; such locks can be distinct from the locks that guard operations on either side of the buffer. The latter locks are referred to as 'main locks' in the present disclosure.

FIG. 3 illustrates an example data structure or data declaration of the buffer operations 302 in one embodiment of the present disclosure. In one embodiment of the present disclosure, the tracking of used and empty slots is disassociated from the main put-related and take-related locks. In one embodiment, only one variable, for example, "numberOfUsedSlots" 304 is used to infer both numbers. In one embodiment, the variable numberOfUsedSlots is declared as java.util.concurrent.AtomicInteger and updated using incrementAndGet by put operations and by decrementAndGet by take operations as shown at 306. Therefore, put operations no longer need to acquire the take-related lock and take operations no longer need to acquire the put-related lock. Declaring numberOfUsedSlots as AtomicInteger allows for fast atomic increment and decrement operations thus reducing latency. Furthermore, the operations are non-blocking and hence if the buffer is neither empty nor full, putters and takers are not delayed by each other.

Figure 1:
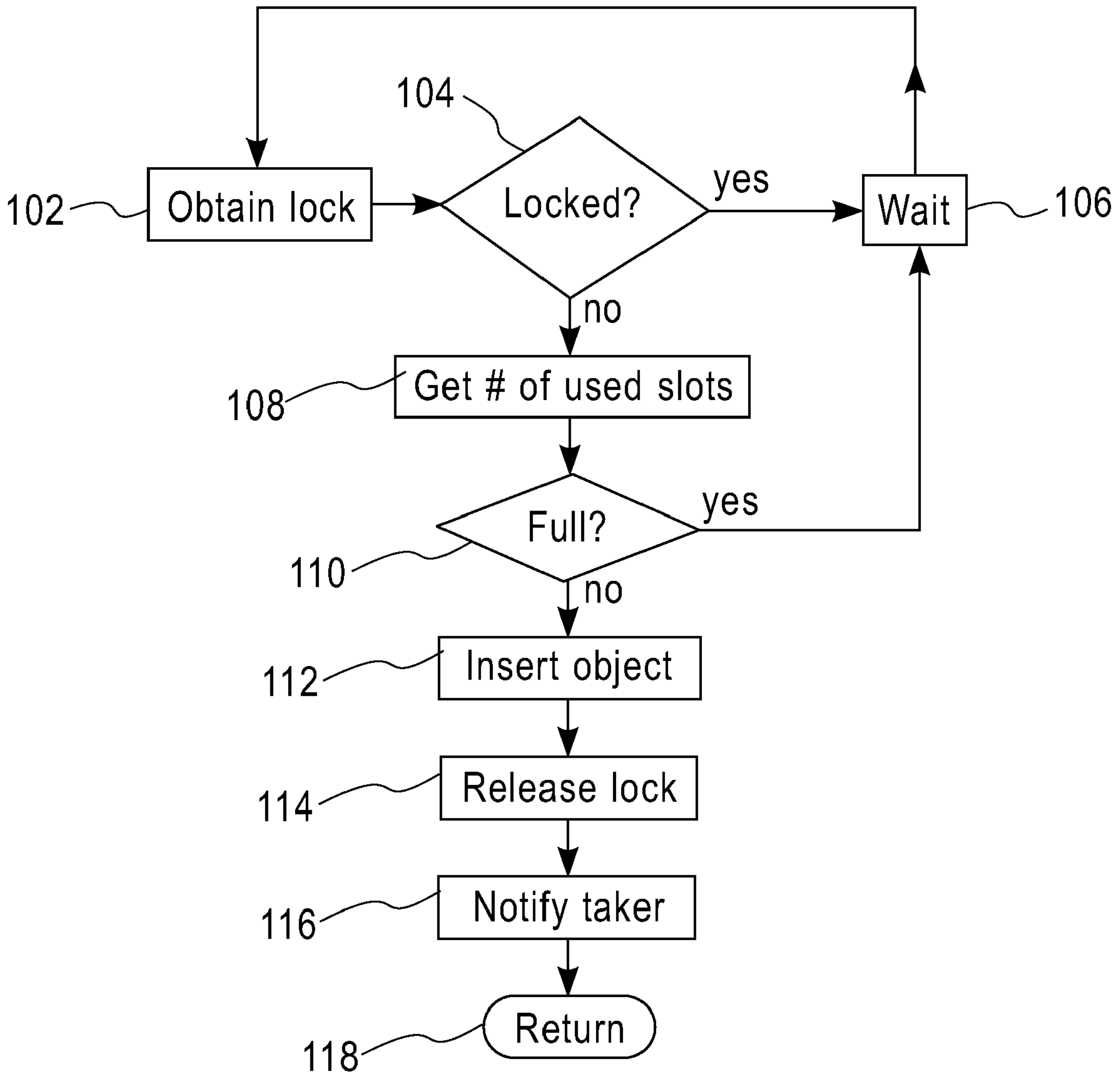
FIG. 1 is a flow diagram illustrating a put operation in one embodiment of the present disclosure.

FIG. 1 is a flow diagram illustrating a put operation in one embodiment of the present disclosure. At 102, a putter thread attempts to obtain a lock for inserting operation on the buffer. If the lock is obtained at 104) the number of used slots in the buffer is determined at 108. If it is determined that the number of used slots is less than the buffer size of a given buffer, that is, the buffer is not full at 110, the putter thread inserts the object into the buffer at 112 and increments the number of used slots. At 114, the lock is released. At 104, if the lock was not available, for example, another putter thread has it locked, the putter thread waits until the lock is available at 106. Similarly, at 110, if the buffer is full, the putter thread waits, for example, until a slot becomes available in the buffer, or there is a timeout. In this embodiment, the lock for putting objects into the buffer is held only during the operation on the buffer. The present invention is oblivious to the implementation of the wait process, that is, any implementation that meets the specification of a programming language or library that defines the semantics of wait is possible. Common implementations, e.g., of the Java wait construct, are busy waiting, waiting with suspend, or combinations of both. FIG. 4 illustrates a put operation in one embodiment of the present disclosure. As shown, the lock that guards the operations of the takers is obtained and held only during the operation at 402.

Figure 2:
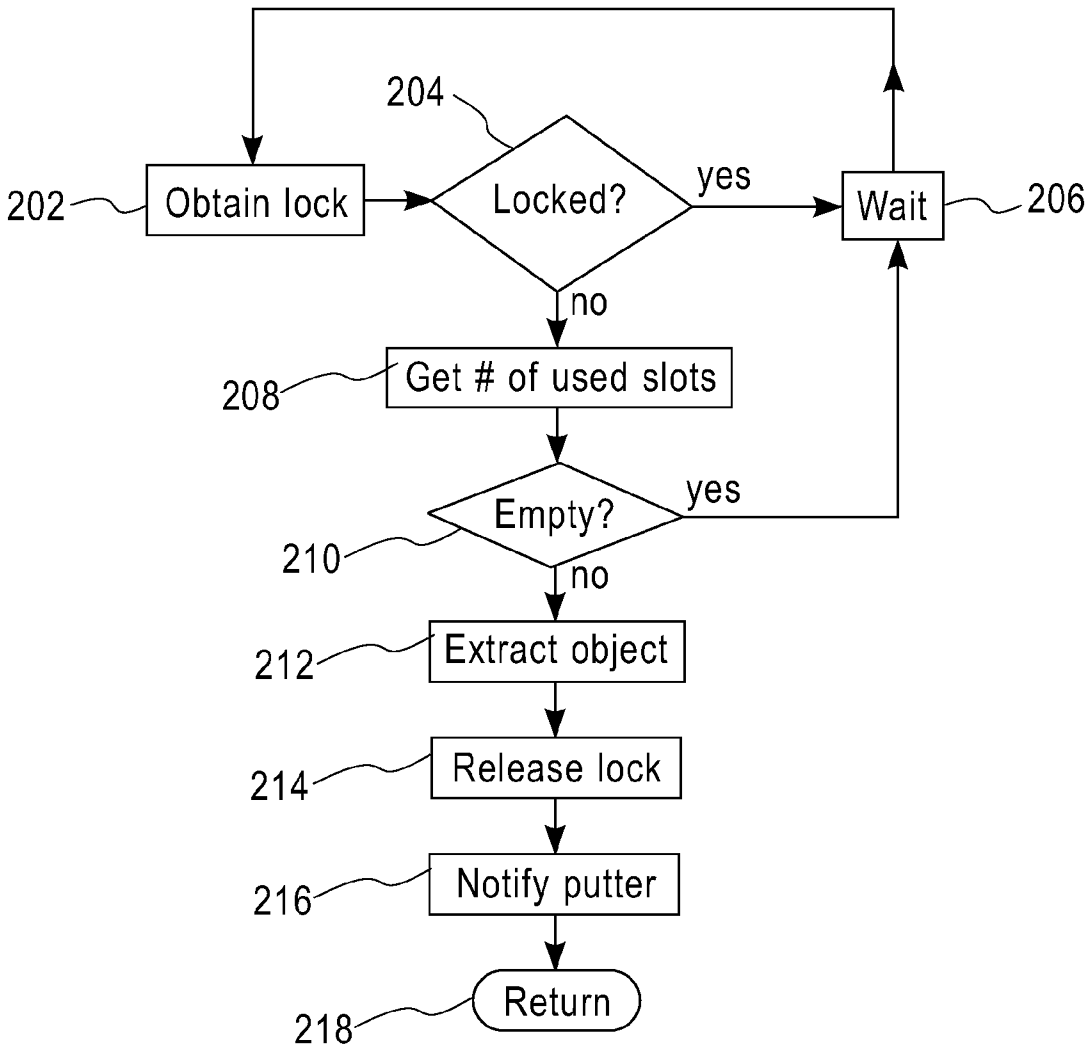
FIG. 2 is a flow diagram illustrating a take operation in one embodiment of the present disclosure.

FIG. 2 is a flow diagram illustrating a take operation in one embodiment of the present disclosure. At 202, a taker thread attempts to obtain the lock for extracting operation on the buffer. If the lock is obtained at 204, the number of used slots in the buffer is determined at 208. If it is determined that the number of used slots is greater than zero, that is, the buffer is not empty at 210, the taker thread extracts the object into the buffer at 212 and decrements the number of used slots. At 214, the lock is released. If at 204, the lock was not available, for example, another taker thread has it locked, the taker thread waits until the lock is available at 206. Similarly, if at 210, the buffer is empty, the taker thread waits, for example, until an object is inserted in the buffer, or there is a timeout. In this embodiment, the lock for taking objects from the buffer is held only during the operation on the buffer. As described above, the system and method of the present disclosure is transparent to wait process implementation. That is, the system and method of the present disclosure may be applied to various implementations and not limited to a specific wait process implementation. For example, any implementation that meets the specification of a programming language or library that defines the semantics of wait is possible. FIG. 5 illustrates a take operation in one embodiment of the present disclosure. As shown, lock is obtained and held during the operation at 502. Also, as shown in FIGS. 4 and 5, the locks for putting (producer) and extracting (consumer) are independent from one another, such that the two operations do not interfere with one another.

FIG. 6 illustrates separate structures for queuing with wait and notify methods. In this embodiment, wait-notify for the empty and fill buffer conditions are disassociated from the two main locks. The main locks as described above are those locks that guard the operations on either side of the buffer. These locks are distinct from the locks "putQueue_" and "getQueue_" illustrated in FIG. 6, called 'queue locks' in the following description. The queue locks solely serve to implement condition variables and providing wait-notify functionality. In common implementations, the main locks are not inflated hence lock and unlock operations can be executed very efficiently. The additional queue locks are accessed only when needed, that is, when the buffer is empty or full and when the buffer becomes not empty or not fill. Operation "waitPut" is invoked whenever a putter thread finds the buffer full; the putter increments the "putQueueLen_" variable and engages in a waiting process with timeout. The method and system of the present disclosure is independent of the implementation of a wait process as described above. The operation "notifyPut" is invoked by the taker thread in response to removing an item from the queue (FIG. 5, 504). Operation "notifyPut" signals (operation "notify") the "putQueue_" lock if the length of that queue (variable "putQueueLen_") is positive. Since variable "putQueueLen_" is read and updated concurrently by taker and putter threads (data race), a taker may find the variable to be zero although a putter is about to engage in the waiting process. In this case a notification is not done, but forward progress is guaranteed since the putter thread waits with timeout.

Wait and enquiring of threads that find the buffer either full or empty is delayed, that is, the respective threads repeatedly attempt to perform their operation on the buffer before proceeding to queued wait. This form of spinning avoids the costly wait operation in the common case when the access frequency at both ends of the buffer is high.

Similarly, a notify operation to communicate among threads at opposite ends of the queue is performed conditionally, that is, only in cases where threads are actually queuing at the opposite end. This design avoids the costly lock acquire-release sequence that some programming language implementation requires when invoking a notify function.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for implementing concurrent producer-consumer buffers, comprising:

providing a putter lock;

said putter lock performing putter operations associated with a concurrent producer-consumer buffer;

providing a taker lock;

said taker lock performing taker operations associated with the concurrent producer-consumer buffer;

allowing said putter operations to acquire and lock the putter lock when putting into the concurrent producer-consumer buffer; and allowing said taker operations to acquire and lock the taker lock when taking from the concurrent producer-consumer buffer;

said putter operations and taker operations being performed independently of one another, said taker and said putter lock being acquired and released independently of one another and independently of an associated wait-notify mechanism;

wherein one putter operation waits for another putter operation to release the putter lock, and wherein tracking of used and empty slots is disassociated from the putter lock and the taker lock, and one variable is used for the tracking of used and empty slots, said one variable being implemented as an atomic object operable for atomic operation, and wherein the putter operations need not acquire the taker lock and the taker operations need not acquire the putter lock, and wherein the putter lock guards inserting operations by a plurality of threads and the taker lock guards extracting operations by the plurality of threads, wherein the putter lock and the taker lock are two main locks associated with the concurrent producer-consumer buffer as a whole.

2. The method of claim 1, wherein the putter operation waits for the concurrent consumer-producer to become not full if the concurrent consumer-producer is full, without locking the putter lock or the taker lock.

3. A method for implementing concurrent producer-consumer buffers, comprising:

acquiring a first lock;

said first lock inserting an element in a concurrent producer-consumer buffer;

acquiring a second lock;

said second lock extracting an element from the concurrent producer-consumer buffer, wherein said inserting and extracting can be performed simultaneously without interfering with one another, and wherein said first lock and said second lock are acquired and released independently of an associated wait-notify mechanism providing suspend and notification procedures when the concurrent producer-consumer buffer becomes empty or full;

wherein a plurality of threads insert into the concurrent producer-consumer buffer, and for another thread to insert into the concurrent producer-consumer buffer, said another thread waits for the first lock to unlock, and wherein tracking of used and empty slots is disassociated from the first lock and the second lock, and one variable is used for the tracking of used and empty slots, and wherein the inserting need not acquire the second lock and the extracting need not acquire the putter lock, and wherein the first lock guards inserting operations by the plurality of threads and the second lock guards extracting operations by the plurality of threads, wherein the first lock and the second lock are two main locks associated with the concurrent producer-consumer buffer as a whole.

4. The method of claim 3, wherein said first lock, said second lock, and said wait-notify mechanism are distinct.

5. The method of claim 3, wherein said first lock is acquired only when an element is being inserted into the concurrent producer-consumer buffer and said first lock is released as soon as said element is inserted.

6. The method of claim 3, wherein said second lock is acquired only when an element is being extracted from the concurrent producer-consumer buffer and said second lock is released as soon as said element is extracted.

7. A system for implementing concurrent producer-consumer buffers, comprising:

a first lock associated with an insertion operation performed on a concurrent producer-consumer buffer;

a second lock associated with an extraction operation performed on the concurrent producer-consumer buffer;

a controller acquiring the first lock for inserting a first element in the concurrent producer-consumer buffer, the controller further acquiring a second lock for extracting a second element from the concurrent producer-consumer buffer, said controller further inserting into and extracting from the concurrent producer-consumer buffer simultaneously, and wherein the controller is acquiring and releasing said first lock and said second lock independently of an associated wait-notify mechanism when the concurrent producer-consumer buffer becomes empty or full;

wherein a plurality of threads executing on the controller insert into the concurrent producer-consumer buffer, and for another thread to insert into the concurrent producer-consumer buffer, said another thread waits for the first lock to unlock, and wherein tracking of used and empty slots is disassociated from the first lock and the second lock, and one variable is used for the tracking of used and empty slots, said one variable being implemented as an atomic object operable for atomic operation, and wherein the inserting need not acquire the second lock and the extracting need not acquire the putter lock, and wherein the first lock guards inserting operations by the plurality of threads and the second lock guards extracting operations by the plurality of threads, wherein the first lock and the second lock are two main locks associated with the concurrent producer-consumer buffer as a whole.

8. The system of claim 7, wherein said first element and said second element are the same element.

9. The system of claim 7, wherein said first lock, said second lock and said wait-notify mechanism are distinct.

10. The system of claim 7, wherein the controller is further acquiring said first lock only for inserting said first element into the concurrent producer-consumer buffer and releasing said first lock as soon as said first element is inserted.

11. The system of claim 7, wherein the controller is further acquiring said second lock only for extracting said second element from the concurrent producer-consumer buffer and releasing said second lock as soon as said second element is extracted.

12. A program storage device readable by a machine, tangibly embodying a program of instructions executable by the machine to perform a method for implementing concurrent producer-consumer buffers, comprising:

acquiring a first lock for inserting an element in a concurrent producer-consumer buffer;

acquiring a second lock for extracting an element from the concurrent producer-consumer buffer, wherein said inserting and extracting can be performed simultaneously without interfering with one another, and wherein said first lock and said second lock are acquired and released independently of an associated wait-notify mechanism providing suspend and notification procedures when the concurrent producer-consumer buffer becomes empty or full;

wherein a plurality of threads insert into the concurrent producer-consumer buffer, and for another thread to insert into the concurrent producer-consumer buffer, said another thread waits for the first lock to unlock, and wherein tracking of used and empty slots is disassociated from the first lock and the second lock, and one variable is used for the tracking of used and empty slots, said one variable being implemented as an atomic object operable for atomic operation, and wherein the inserting need not acquire the second lock and the extracting need not acquire the putter lock, and wherein the first lock guards inserting operations by the plurality of threads and the second lock guards extracting operations by the plurality of threads, wherein the first lock and the second lock are two main locks associated with the concurrent producer-consumer buffer as a whole.

13. The program storage device of claim 12, wherein said first lock, said second lock, and said wait-notify mechanism are distinct.

14. The program storage device of claim 12, wherein said first lock is acquired only for inserting an element into the concurrent producer-consumer buffer and said first lock is released as soon as said element is inserted.

15. The program storage device of claim 12, wherein said second lock is acquired only for extracting an element from the concurrent producer-consumer buffer and said second lock is released as soon as said element is extracted.

* * * * *